Sept. 30, 1941. H. GRIFFIN ET AL 2,257,551
METHOD AND MEANS OF PRODUCING MOTION PICTURES
Filed Feb. 26, 1938 2 Sheets-Sheet 1

INVENTORS
Herbert Griffin
Julius Pearlman
BY Hastings W. Baker
ATTORNEYS.

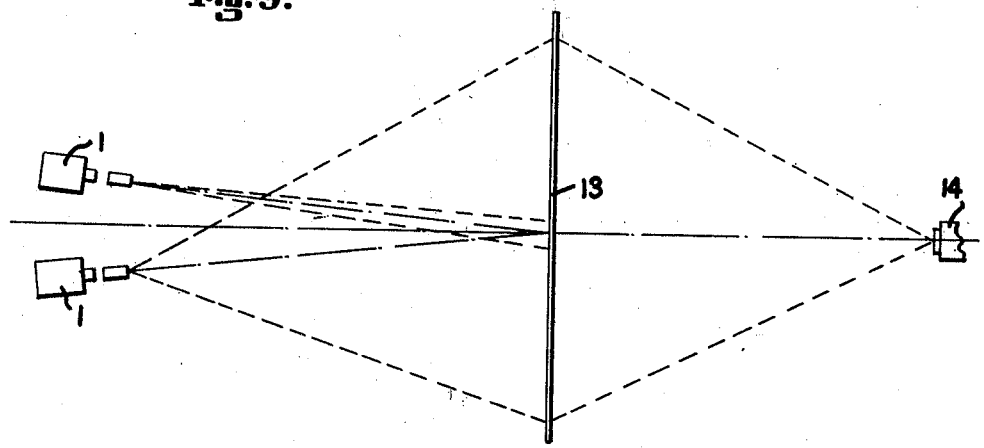
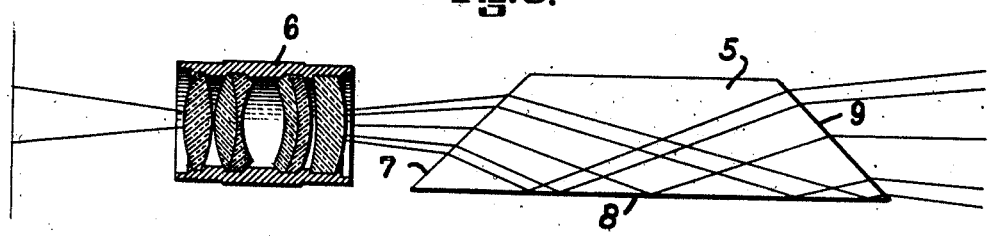
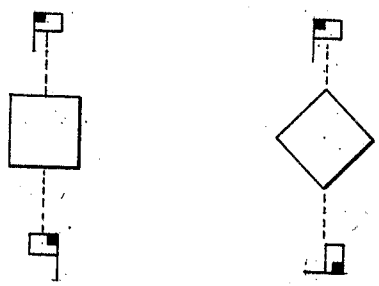

Patented Sept. 30, 1941

2,257,551

UNITED STATES PATENT OFFICE 2,257,551

METHOD AND MEANS OF PRODUCING MOTION PICTURES

Herbert Griffin, Jersey City, N. J., and Julius Pearlman, New York, N. Y., assignors to International Projector Corporation, New York, N. Y., a corporation of Delaware Application February 26, 1938, Serial No. 192,698

5 Claims. (Cl. 88—16)

One of the objects of this invention is to provide means whereby a picture may be produced which is a composite picture showing a natural background on which appears a picture of a movable object which may be made to appear in another position than it was in when originally photographed. As an illustration of such use, we might take pictures of a mountain range or other objects from an airplane which is flying very smoothly and taking particular pains to exclude from the said pictures any part of the airplane. When the background plates or shots are projected in the studio, they would appear on the screen just as they were originally taken. Suppose, however, it is desired that it should be made to appear that the airplane was in trouble, as for instance, that it was rolling or even making complete revolutions in what is commonly known as the barrel roll. We could produce such an effect as follows:

Place in the studio an imitation of the airplane and place a camera within the representation of the airplane. If the original background plates showing the mountain range, for instance, are now projected on a screen and the background is rotated, the pictures taken by the camera in the imitation airplane would show a part of the airplane and the background rotating through any number of degrees desired. The pictures taken by the camera in the airplane when developed and projected on a screen would show a relative rolling motion between the background and the airplane which creates the illusion that the background was not rotating but the airplane was.

We propose to use a prism in the projection machine which projects the original background plates so that instead of rotating the entire projection machine, it is necessary to rotate only the prism which is placed within the beam of light from the projector.

Of course, it is not necessary to rotate the background in all cases, for we might rotate the movable object such as an airplane or a ship at sea. As an illustration of this, we might take pictures of a mountain range with no airplane appearing in the shots. We might then take a second set of shots of an airplane flying along smoothly. If both sets of pictures were then projected on a translucent screen and if in the beam of light from the projector which is projecting the pictures of the airplane we placed the prism, and rotated the said prism, the projected pictures of the airplane would appear on the translucent screen against the background of a mountain range making the illusion that the airplane was rolling. In order to reproduce these composite pictures of a stationary background consisting of a mountain range with an airplane rolling, we would, of course, place a camera on the other side of the translucent screen from the projectors and would make a set of moving pictures of what appeared on the screen.

It might not be necessary to project two sets of pictures on a translucent screen. For instance, suppose we wish to produce a scene showing natural objects as viewed by a drunken man with everything reeling around. As an illustration, suppose the drunken man is viewing some dancing girls. We might take the pictures of the dancing girls just as they perform. If then we projected these pictures on a screen and interposed the prism in the beam of projected light and rotated the said prism, it would appear as though the floor with the dancing girls thereon was rotating to ridiculous angles or possibly even turning upside down. If a translucent screen were employed and a camera were placed on the other side of the screen, pictures might be taken showing the scene distorted to create the illusion as to how it would appear to the drunken man.

Innumerable illustrations might be given as to the practical use of such a combination of mechanisms and of the method employed, but it is believed that the above illustrations will suffice as a few examples.

In the following description we have described one type of mechanism which might be employed, but we have done this by way of illustration only for we realize that many changes might be made therein without departing from the spirit of the invention.

The invention may be best understood by referring to the attached drawings in which;

Fig. 6 is a diagrammatical representation of the path of travel of the various beams of light through the projecting lens and the prism.

Fig. 7 indicates that when the prism is in one position and a picture is made of a flag, the flag would appear upright in its natural position, except that the right hand side would be the left hand side.

Fig. 8 is the same as Fig. 7 but showing that if the prism were rotated 45°, the objects photographed would appear to be rotated 90° or twice as many degrees.

Fig. 9 shows two projectors projecting pictures simultaneously on a translucent screen with a camera on the opposite side of the screen which serves as a means to photograph the composite pictures.

Figure 10:
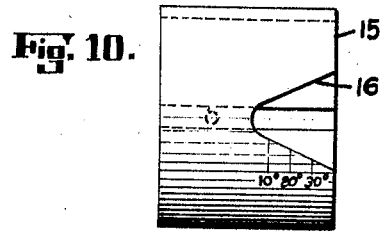

Fig. 10 is a side elevational view of a sleeve provided with a notch to limit the movement of the handle.

Figure 1:
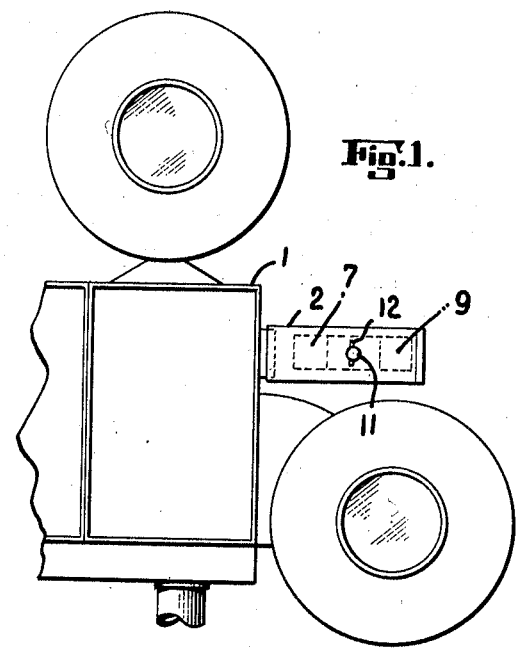
Fig. 1 is a fragmentary side elevational view of a projector with a prism incorporated therein.
Figure 2:
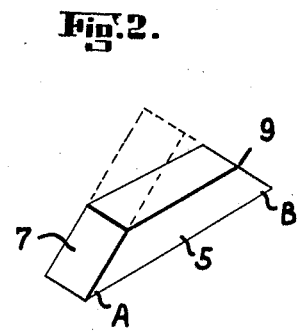
Fig 2 is a perspective view of the prism per se.
Figure 4:
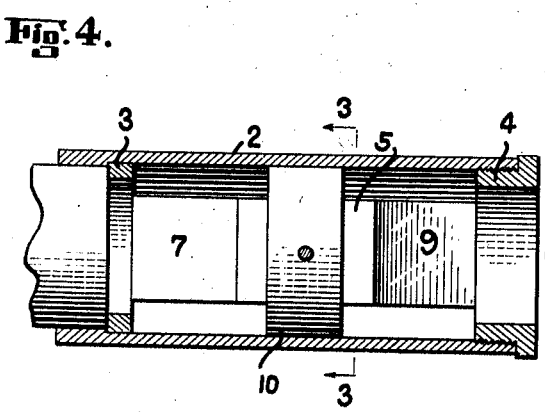
Fig. 4 is a cross sectional view of the prism holder showing the prism therein.
Figure 3:
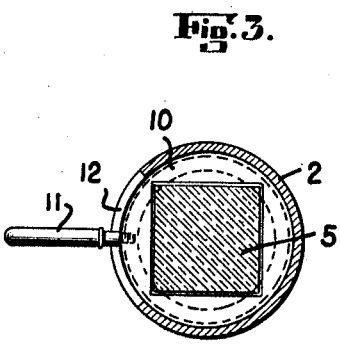
Fig. 3 is a cross sectional view of the prism and the means to rotate the same, taken on the line 3—3 of Fig. 4.

In the drawings the projector 1 has attached to the front thereof a prism holder 2. Within the bore of the prism holder are two rings 3 and 4 which hold the prism 5 against longitudinal movement. The prism 5 may be a triangular prism as is indicated in dotted lines in Fig. 2, or it may be a frustum of a triangle as indicated in full lines in Fig. 2. Preferably, the angles A and B of the said prism are 45° but this is not absolutely necessary as they might be some other degree, such as 60°.

As is well known, the light passing through the lens denoted generally by the reference character 6 in Fig. 6 is dispersed and when the various rays thereof meet the surface of the prism nearest to the lens, the rays of light are bent downwardly from the surface 7 nearest the lens according to the index of refraction of the particular kind of glass employed for the lens. The rays of light which are thus bent downwardly would strike the surface 8 and be reflected therefrom so that the two angles formed by the rays of light with the surface 8 would be equal. These reflected rays of light would then pass upwardly through the prism and upon leaving the surface 9 would be bent downwardly, and from thence would pass to the screen. The reason that a frustum of a triangle is suggested is because the upper portion of the triangle would be useless for the rays of light which might strike the part of the prism indicated by the dotted lines in Fig. 2 would not be bent downwardly sufficiently so as to ever strike the surface 8, and hence would be useless. However, there is no objection to employing a triangular prism and using only the lower portion thereof. If the surface 8 is horizontal as indicated in Fig. 6, it is obvious that the object viewed would appear upside down, for the lowermost rays of light from the lens become the uppermost rays of light on leaving the surface 9. If, however, the surface 8 were in a perpendicular plane, it is obvious that the object viewed would appear upright, but its right hand side would be its left hand side as indicated in Fig. 7. If the lens were rotated so that the surface 8 was at an angle of 45° to the perpendicular, a perpendicular object viewed would appear to be horizontal, as shown in Fig. 8, the upper flag denoting the object viewed and the lower flag denoting the optical impression. It is, therefore, apparent that by simply rotating the prism for any number of degrees the optical effect produced is that the object viewed is rotated twice that number of degrees.

In order to rotate the prism, we have mounted the same in a ring 10 to which is attached a handle 11 projecting through a slot 12 in the lens holder.

It has heretofore been proposed to provide a rotatable lens in connection with a camera. Such a device is shown in the patent to Douglas, 1,632,221. With such a device the patentee could make the pictures of a building appear so that the visual impression is that the building is swaying. We do not propose to use the prism in connection with a camera, but we propose to take the pictures with an ordinary camera showing the objects photographed in their natural positions. This is highly important for it is frequently impossible originally to take the pictures showing the objects photographed tilted to precisely the desired angle. If the camera were provided with such a rotatable lens it would frequently be necessary to go back to the original scene, possibly thousands of miles away, and retake it, but we propose to take the scene in its natural position and to employ the rotatable lens on the projector in the laboratory or studio. If in rotating the lens a mistake is made so that it is rotated too much or too little, it is a minor matter to reproduce the original pictures any number of times in the laboratory, photographing the projected pictures until we have the resultant pictures precisely as desired.

In case we wish to produce a picture taken from the inside of an airplane, showing the airplane rolling over and over, we would proceed as follows. We would take pictures of the background with a camera, the pictures being undistorted pictures and showing no rolling at all. The cameraman would be careful to exclude any part of the airplane from the shots thus taken. The pictures would then be projected by a projector on a translucent screen 13. In the front of this projector we would place the said lens and would rotate it so as to make the backround roll to any extent desired. A camera 14 would be placed within a representation of an airplane so as to take a part of the airplane and the pictures showing on the screen 13. The airplane would then appear to have relative rotation to the background which appears on the screen, and when the pictures taken by the camera 14 are developed and projected, the observer would get the impression that the background was standing still and the airplane was rolling.

If, however, we wish to make it appear that a ship is rolling at sea or that an airplane is rolling over and over against a background of a mountain range, we would photograph the background in its natural position, and the lower projector 1 shown in Fig. 9 would project the pictures of the background on the screen 13. This projector would not be provided with a rotatable lens, or if it were the said lens would not be rotated. We would make separate shots of the airplane and the pictures thus produced would be projected through the other projector, which is indicated as the upper one in Fig. 9, which projector would be provided with a rotatable lens and as the pictures of the airplane were rotated upon the background of the mountain range, the said lens would be rotated so that the airplane would appear to turn any number of degrees desired or to roll over. The camera 14 on the other side of the screen 13 would then take pictures of the two sets of pictures appearing on the screen, and when the film from the camera 14 was developed and projected the natural background would appear with a rolling airplane. A similar plan might be used to make a ship roll at sea.

If there is any objection to the right hand side of a picture appearing as the left hand side, as shown in Fig. 7, this may be rectified by using an additional prism similar to the prism 5, but with its surface 8 extending at right angles to the surface 8 of the other prism.

Of course, it will be understood that the shutters to the projectors are operated simultaneously so that the superimposed pictures will appear on the screen simultaneously and that the shutter of the camera will simultaneously be operated so that the camera will take the pictures at the instant that they appear on the screen. Inasmuch as this synchronous mechanism is old, and well known in the art, no detailed description thereof is herein given.

While we have shown in Fig. 6 the prism as mounted in front of the lens 6, it might be possible to mount the same in some other position, such as in the lens mechanism itself, or in some cases, possibly on the rear side of the lens, although usually this would not be desirable.

Figure 5:
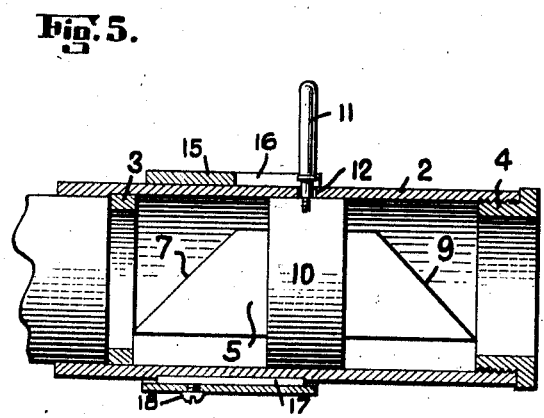
Fig 5 is a view similar to Fig. 4, but with the prism rotating means rotated 90° from the position shown in Fig. 4.

In some instances it may be desirable to limit the amount of movement which may be imparted to the handle 11. This would be valuable in case it is desired to indicate that a ship is rocking, so that the amount that it will rock to the right will be the same amount that it will rock to the left. Such a means may be embodied in providing a sleeve 15 provided with a V-shaped notch 16 facing the handle, which sleeve 15 is provided with a groove which receives a key or spline 17 secured to the member 2. The sleeve may be provided with indicia such as 10°, 30°, etc., which would indicate that if the sleeve 15 is moved to the right as shown in Fig. 5 so that the handle 11 will be adjacent the indicia, it would denote the number of degrees which the prism may be rotated to the right or to the left. If it is desired to secure the sleeve at this point, it may be accomplished by tightening the set screw 18. If it is not desired to limit the movement of the handle 11 and the prism, the sleeve 15 would be moved to the left as viewed in Fig. 5 so as to be entirely beyond the path of movement of the handle 11.

In this specification and the subjoined claims we have used the words "rotate" and "rotatable" in the sense of having angular movement on the axis of the prism, but not necessarily meaning a complete rotation through 360°. We have used the words as meaning that the prism 5 rotates on its axis through any number of degrees.

We believe that this is a novel method of producing moving pictures and that the mechanism to be employed in making the same is likewise new. We, therefore, desire to claim the invention broadly, except as we may limit ourselves in the annexed claims.

Having now described our invention, we claim:

1. In combination, two motion picture projectors, a rotatable prism mounted on a part of one of said projectors and positioned in its light beam, a screen on which both of the sets of pictures from said projectors appear in the same frame, and means to rotate said prism so that pictures projected by the beam of light passing through said prism will appear to rock relative to the set of pictures projected by the other projector.

2. In combination, two motion picture projectors, a rotatable prism mounted on a part of one of said projectors and positioned in its light beam, a translucent screen on which both of the sets of pictures from said projectors appear in the same frame, means to rotate said prism so that pictures projected by the beam of light passing through said prism will appear to rock relative to the set of pictures projected by the other projector and a camera placed on the other side of said translucent screen from said projector to photograph the composite pictures on said screen.

3. The method of making an optical illusion in moving pictures consisting of photographing a background and a second set of photographs of a movable object, developing said photographs into two film projection strips, projecting the pictures on the background onto a screen and simultaneously projecting the pictures of the movable object through a rotatable prism and onto the screen so that as said prism is rotated, the movable object will appear to rock relative to the background.

4. The method of making moving pictures consisting of making photographs of a background and a second set of photographs of a movable object, developing said photographs into two film projection strips, projecting the pictures on the background onto a screen, simultaneously projecting the pictures of the movable object through a rotatable prism and onto the screen so that as said prism is rotated, the movable object will appear to rock relative to the background, and simultaneously taking pictures of the composite pictures appearing on the screen.

5. The method of making moving pictures consisting of photographing a background and a second set of photographs of a movable object, developing said photographs into two film projection strips, projecting the pictures on the background onto a screen, simultaneously projecting the pictures of the movable object through a rotatable prism and onto the screen so that as said prism is rotated, the movable object will appear to rock relative to the background, simultaneously taking pictures of the composite pictures appearing on the screen, and simultaneously operating the shutters of the projectors and the camera which takes the composite pictures.

HERBERT GRIFFIN.
JULIUS PEARLMAN.